(12) United States Patent
Liu et al.

(10) Patent No.: US 8,215,981 B2
(45) Date of Patent: Jul. 10, 2012

(54) USB DEVICE WITH HEAT DISSIPATING THERMAL LINK

(75) Inventors: Yi-Chiang Liu, Taipei Hsien (TW); Chien-Ming Peng, Taipei Hsien (TW)

(73) Assignee: Wistron NeWeb Corp., Hsinchu (TW)

( * ) Notice: Subject to any disclaimer, the term of this patent is extended or adjusted under 35 U.S.C. 154(b) by 222 days.

(21) Appl. No.: 12/766,618

(22) Filed: Apr. 23, 2010

(65) Prior Publication Data

US 2011/0136352 A1    Jun. 9, 2011

(30) Foreign Application Priority Data

Dec. 4, 2009   (TW) ................................ 98141475 A

(51) Int. Cl.
*H01R 13/00* (2006.01)
(52) U.S. Cl. .................................. 439/487; 361/679.54
(58) Field of Classification Search ................. 439/76.1, 439/487; 361/688, 679.46, 679.54
See application file for complete search history.

(56) References Cited

U.S. PATENT DOCUMENTS

| 4,689,720 | A  | * | 8/1987 | Daszkowski | 361/704 |
|---|---|---|---|---|---|
| 5,898,569 | A  | * | 4/1999 | Bhatia | 361/700 |
| 7,359,208 | B2 | * | 4/2008 | Ni | 361/752 |
| 2002/0131122 | A1 | * | 9/2002 | Anderl et al. | 359/152 |
| 2007/0127223 | A1 |   | 6/2007 | Mitsuhashi | |

FOREIGN PATENT DOCUMENTS

TW          M367479          10/2009

* cited by examiner

*Primary Examiner* — Vanessa Girardi

(57) ABSTRACT

A USB device is provided. The USB device includes a housing, a circuit board, a chip, a USB connector and a metal connector. The circuit board is disposed in the housing. The chip is disposed on the circuit board. The USB connector is connected to the circuit board. The metal connector is connected to the USB connector, wherein the metal connector includes an extended portion, and the extended portion contacts the chip to dissipate heat from the chip.

3 Claims, 9 Drawing Sheets

1

USB DEVICE WITH HEAT DISSIPATING THERMAL LINK

CROSS REFERENCE TO RELATED APPLICATIONS

This Application claims priority of Taiwan Patent Application No. 98141475, filed on Dec. 4, 2009, the entirety of which is incorporated by reference herein.

BACKGROUND OF THE INVENTION

1. Field of the Invention

The present invention relates to a Universal Serial Bus (USB) device, and in particular relates to a USB device that dissipates heat.

2. Description of the Related Art

USB devices have been miniaturized and simplified. FIG. 1 shows a conventional USB device 1, wherein the USB device 1 has been miniaturized and simplified. However, along with decreased dimensions, the functions of the USB device 1 are also being enhanced. For example, a chip, such as a wireless network chip, of a USB device may comprise high operating speed and power. Accordingly, however, heat generated from such a USB device would increase due to the enhancements. The USB device 1 comprises a plastic or metal housing. Thus, heat generated from a chip therein, raises the temperature of the housing, which provides discomfort to users.

BRIEF SUMMARY OF THE INVENTION

A detailed description is given in the following embodiments with reference to the accompanying drawings.

A USB device is provided. The USB device includes a housing, a circuit board, a chip, a USB connector and a metal connector. The circuit board is disposed in the housing. The chip is disposed on the circuit board. The USB connector is connected to the circuit board. The metal connector is connected to the USB connector, wherein the metal connector includes an extended portion, and the extended portion contacts the chip to dissipate heat from the chip.

Utilizing the USB device of the embodiment of the invention, the heat generated by the chip is transferred to the extended portion, and guided by the metal connector to the electronic devices which are connected the USB device, such as a notebook or desktop computer. Accordingly, the temperature of the USB device is decreased.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
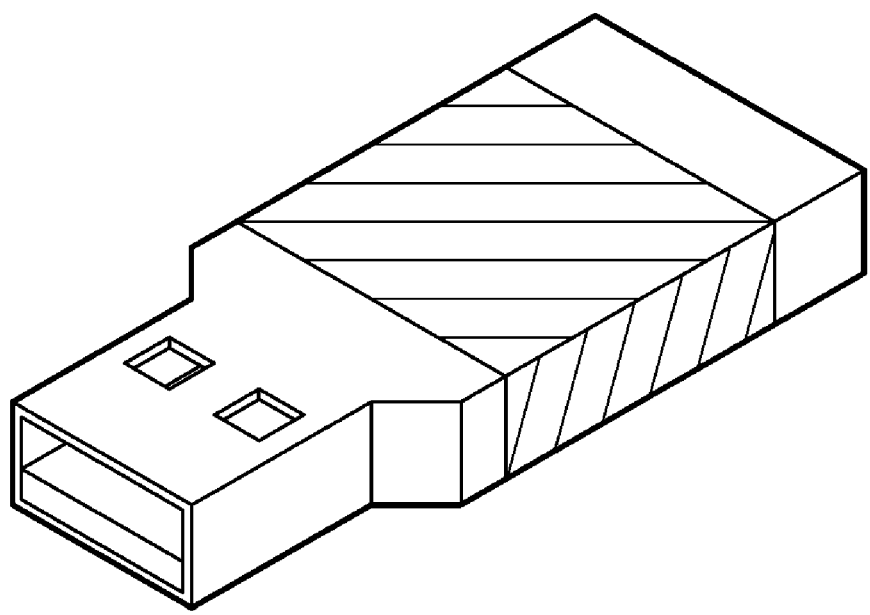
FIG. 1 shows a conventional USB device.
Figure 2A:
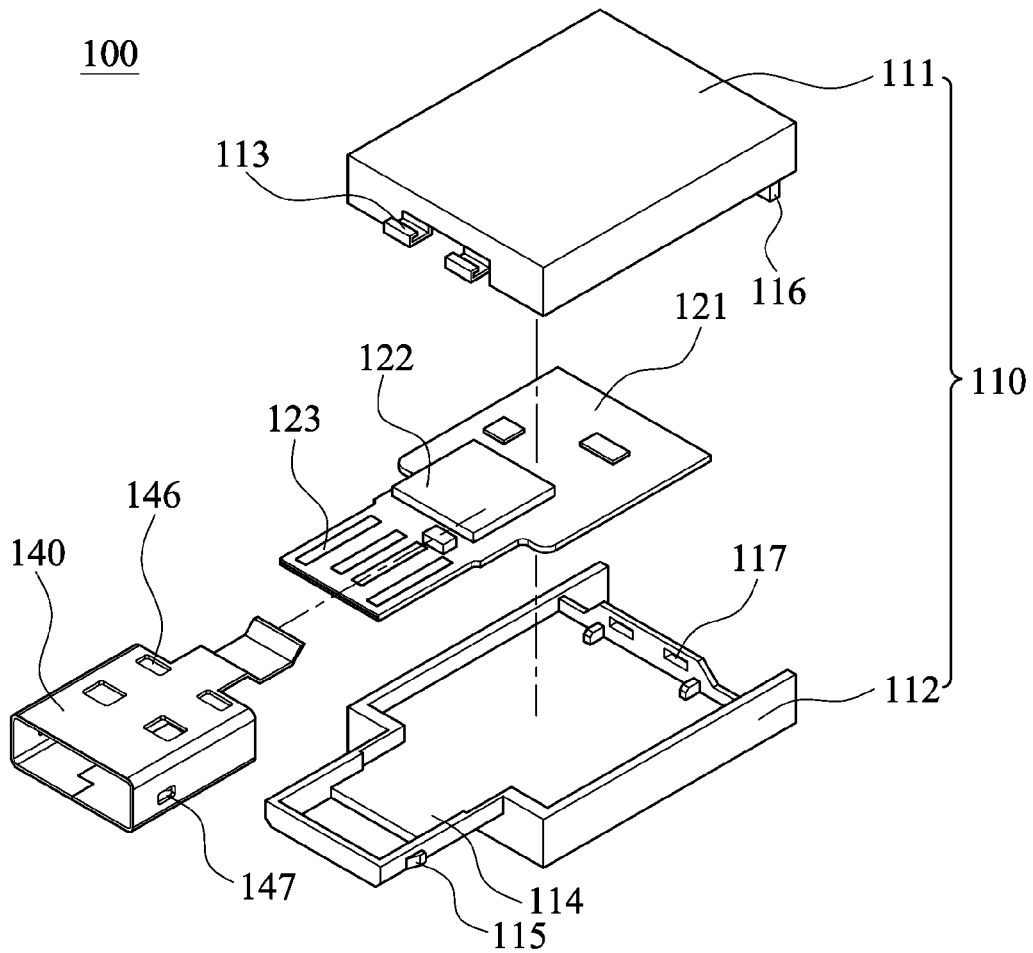
FIG. 2A is an exploded view of a USB device of a first embodiment of the invention.
Figure 3:
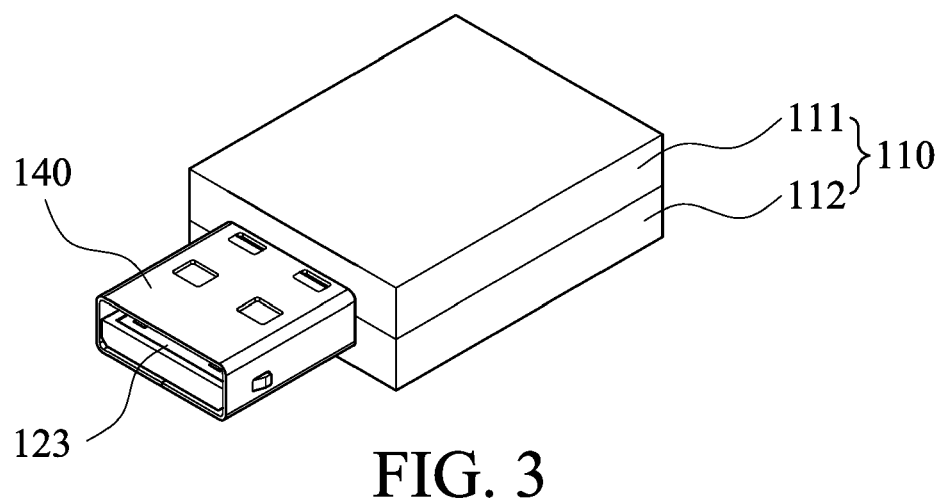
FIG. 3 is an assembly view of the USB device of the first embodiment of the invention.

FIG. 2A is an exploded view of a USB device 100 of a first embodiment of the invention. The USB device 100 comprises a housing 110, a circuit board 121, a chip 122, a USB connector 123 and a metal connector 140. The circuit board 121 is disposed in the housing 110. The chip 122 is disposed on the circuit board 121. The chip 122 generates heat. The USB connector 123 is connected to the circuit board 121. FIG. 3 is an assembly view of the USB device 100 of the first embodiment of the invention. The metal connector 140 is connected to the housing 110. The metal connector 140 surrounds the USB connector 123.

Figure 4:
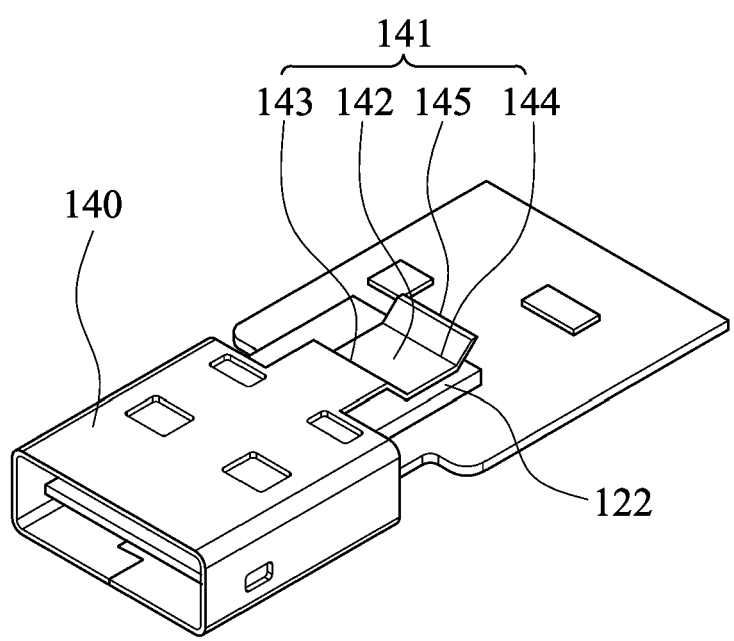
FIG. 4 shows a detailed structure of a metal connector and a circuit board of the first embodiment of the invention.

FIG. 4 shows a detailed structure of the metal connector 140 and the circuit board 121. The metal connector 140 comprises an extended portion 141. The extended portion 141 comprises a first bent portion 143, a contacting portion 142, a second bent portion 144 and a free end 145. The contacting portion 142 is located between the first bent portion 143 and the second bent portion 144. The second bent portion 144 is near to free end 145. The first bent portion 143 is bent toward the chip 122, and the contacting portion 142 contacts the chip 122. The second bent portion 144 turns the free end 145 toward a direction away from the chip 122.

Figure 2B:
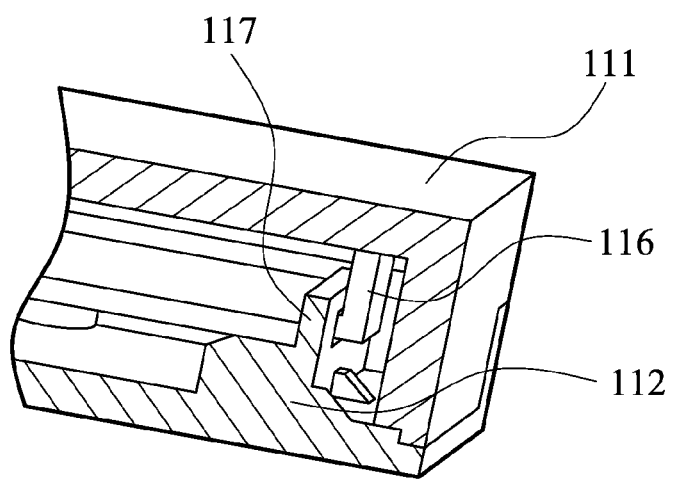
FIG. 2B shows a fixer wedging a fixing portion of the first embodiment of the invention.

With reference to FIG. 2A, the housing 110 comprises a body 112 and a cover 111. The body 112 is connected to the cover 111. The circuit board 121 is sandwiched between the body 112 and the cover 111. The cover 111 has fixers 116. The body 112 has fixing portions 117. FIG. 2B shows the fixer 116 wedging the fixing portion 117.

With reference to FIG. 2A, an opening 146 is formed on the metal connector 140. The cover 111 comprises a wedged portion 113. The wedged portion 113 is wedged to the opening 146. The body 112 comprises a joint receiver 114. The USB connector 123 is received in the joint receiver 114. The metal connector 140 surrounds the joint receiver 114. A positioning opening 147 is formed on the metal connector 140. A positioning protrusion 115 is formed on the joint receiver 114. The positioning protrusion 115 is wedged to the positioning opening 147.

Figure 5A:
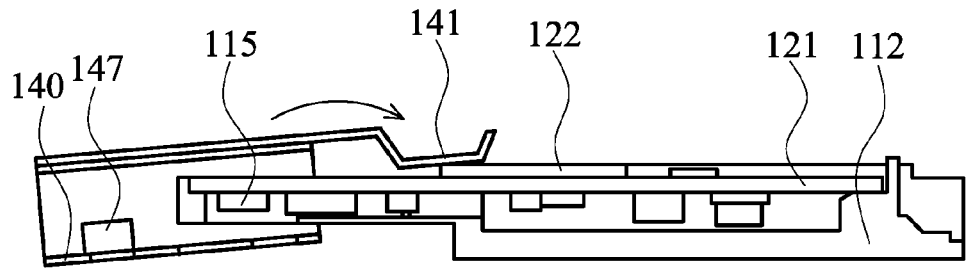
FIGS. 5A, 5B and 5C show assembly steps of the USB device of the first embodiment of the invention.
Figure 5B:
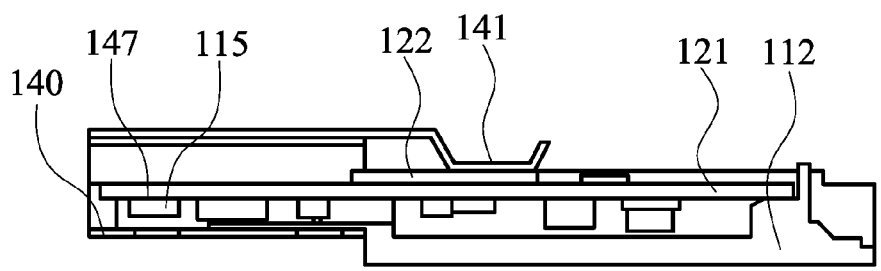
Figure 5C:
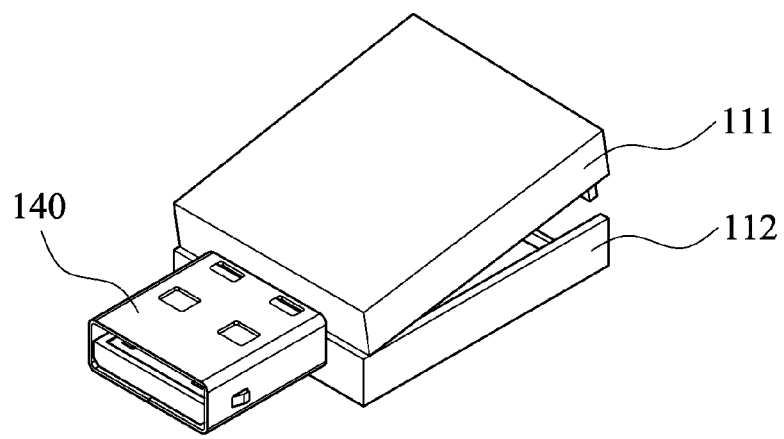

Assembly steps of the USB device 100 of the first embodiment of the invention are described as follows. First, the circuit board 121 is disposed in the body 112. Then, with reference to FIGS. 5A and 5B, the metal connector 140 is wedged to joint receiver 114. Finally, with reference to FIG. 5C, the cover 111 is wedged to the metal connector 140 and the body 112.

Utilizing the USB device 100 of the embodiment of the invention, the heat generated by the chip 122 is transferred to the extended portion 141, and guided by the metal connector 140 to the electronic devices which are connected to the USB device 100, such as a notebook or desktop computer. Accordingly, the temperature of the USB device 100 is decreased.

Figure 6:
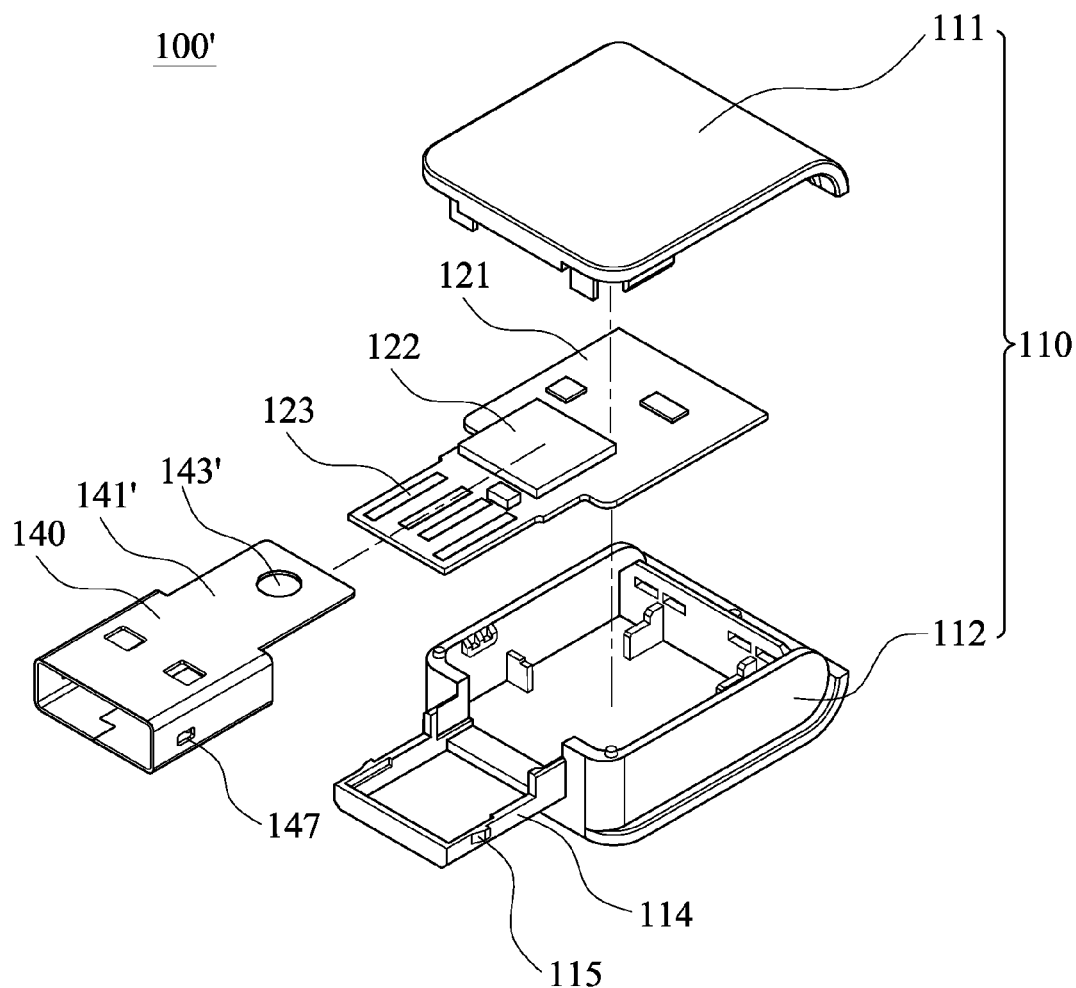
FIG. 6 is an exploded view of a USB device of a second embodiment of the invention.
Figure 7:
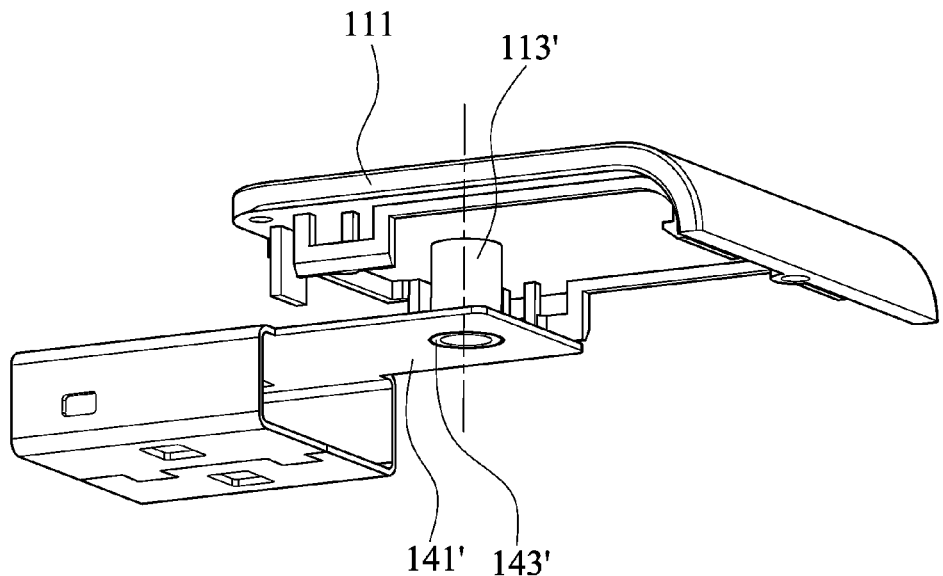
FIG. 7 shows a positioning post of a cover passing through a position hole of the second embodiment of the invention.

FIG. 6 is an exploded view of a USB device 100' of a second embodiment of the invention. Similar to the first embodiment, the USB device 100' comprises a housing 110, a circuit board 121, a chip 122, a USB connector 123 and a metal connector 140. The characteristic of the USB device 100' is that the metal connector has an extended portion 141'. A positioning hole 143' is formed on the extended portion 141'. With reference to FIG. 7, a positioning post 113' is formed on the cover 111, and the positioning post 113' passes through the position hole 143'.

Figure 8:
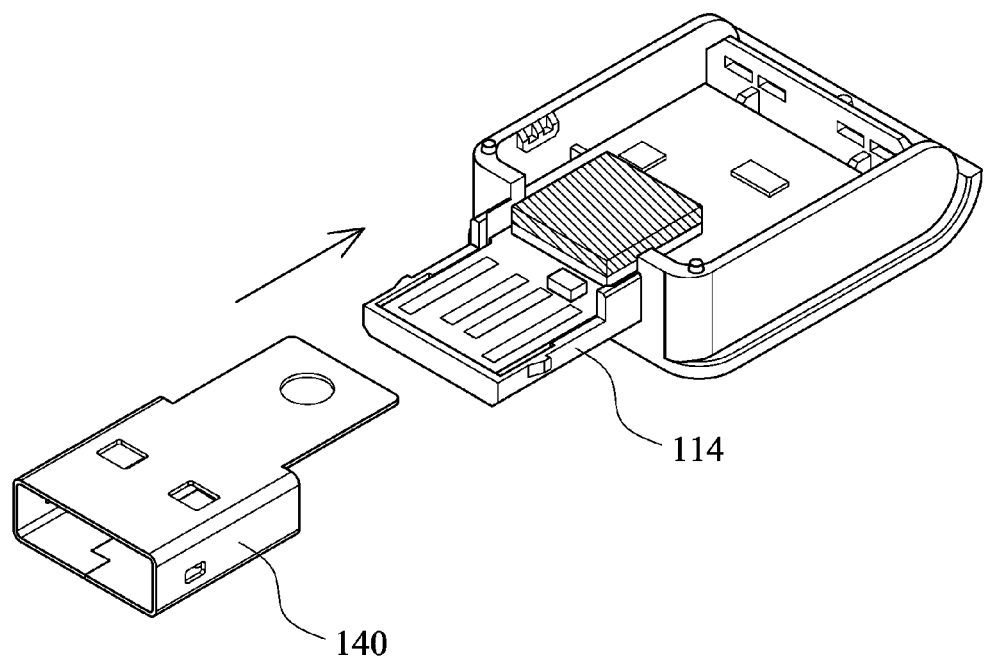
FIG. 8 shows a metal connector wedging a joint receiver of the second embodiment of the invention.
Figure 9:
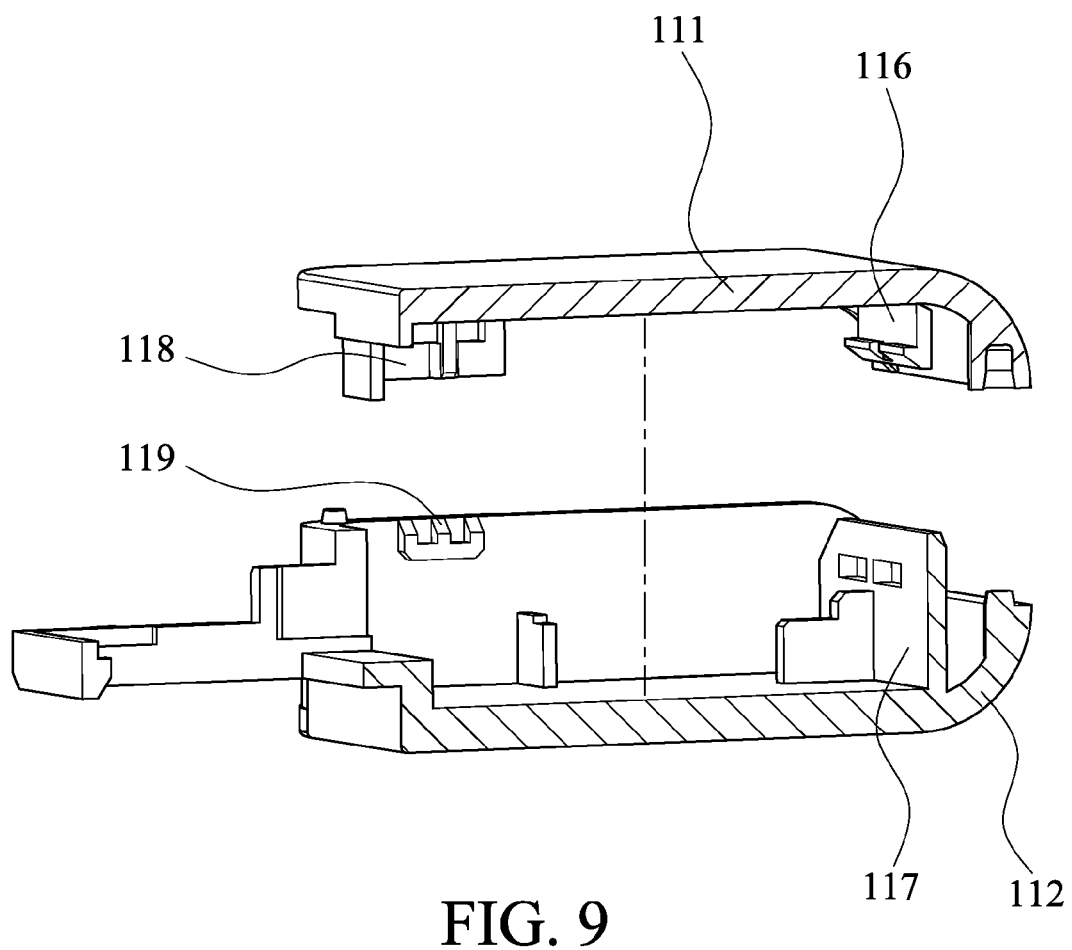
FIG. 9 shows a detailed structure of a cover and a body of the second embodiment of the invention.
Figure 10A:
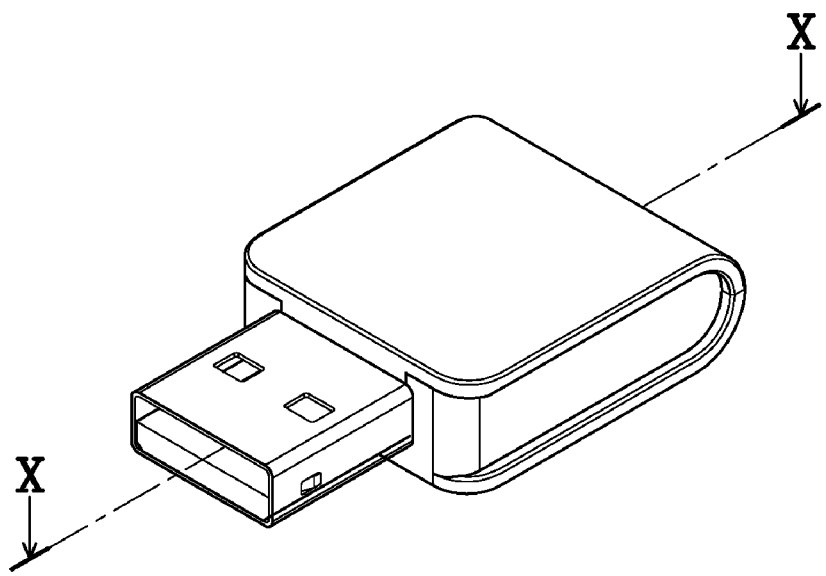
FIG. 10A is an assembled view of the USB device of the second embodiment of the invention.

Assembly steps of the USB device 100' of the second embodiment of the invention are described as follows. First, the circuit board 121 is disposed in the body 112. Then, with reference to FIG. 8, the metal connector 140 is wedged to the joint receiver 114. Finally, the cover 111 is wedged to the metal connector 140 to the cover 112. With reference to FIG. 9, the cover 111 has a fixer 116 and a fixer 118. The body 112 has a fixing portion 117 and a fixing portion 119. The fixer 116 is wedged to the fixing portion 117, and the fixer 118 is wedged to the fixing portion 119. The cover 111 is therefore wedged to the body 112. FIG. 10A is an assembled view of the USB device 100' of the second embodiment of the invention.

Figure 10B:
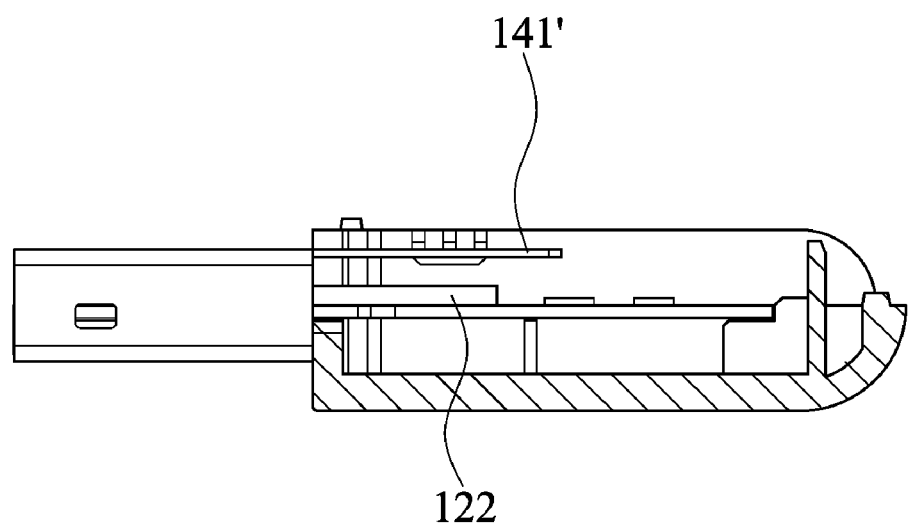
FIG. 10B is a sectional view along X-X direction of FIG. 10A.
Figure 10C:
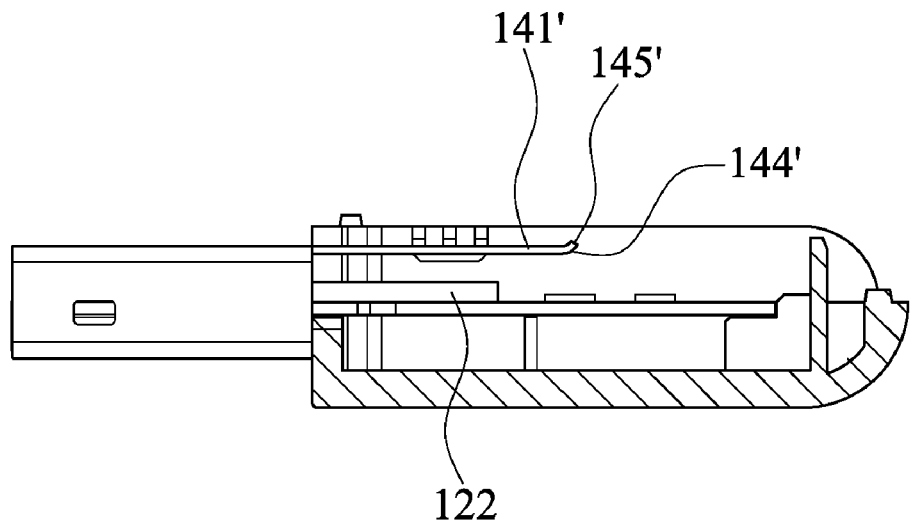
FIG. 10C shows a modified embodiment of the second embodiment.

FIG. 10B is a sectional view along X-X direction of FIG. 10A. The extended portion 141' is located above the chip 122, and the heat generated by the chip 122 is transferred to the extended portion 141' via radiation or convection. FIG. 10C shows a modified embodiment of the second embodiment, wherein the extended portion 141' has a bent portion 144'. The bent portion 144' is near to a free end 145' of the extended portion 141', and bends the free end 141' toward a direction away from the chip 122. The bent portion 144' is curved, and friction between the extended portion 141' and the chip 122 can be reduced.

Figure 10D:
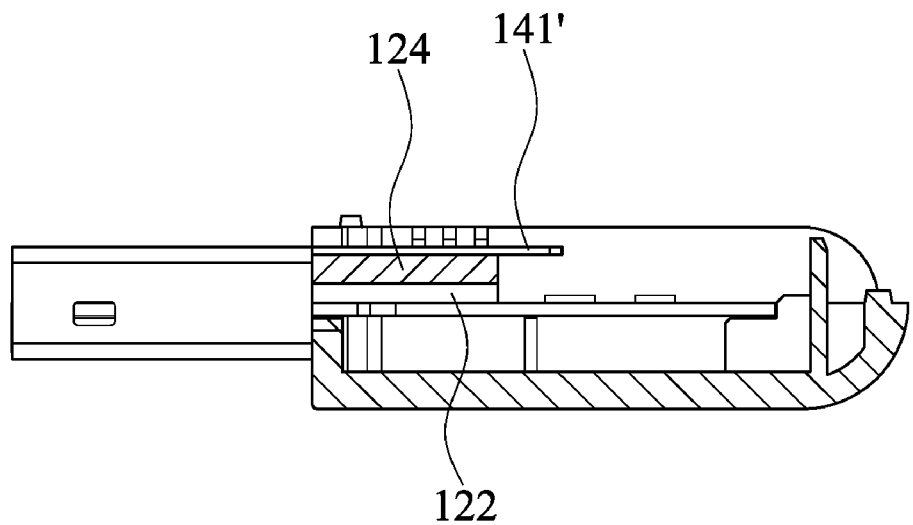
FIG. 10D shows another embodiment of the second embodiment.

FIG. 10D shows another embodiment of the second embodiment, wherein a heat transfer pad 124 is sandwiched between the chip 122 and the extended portion 141'. The heat transfer pad 124 transfers heat from the chip 122 to the extended portion 141' by conduction. The heat transfer pad 124 improves heat transmission effect, and reduces friction between the extended portion 141' and the chip 122.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A USB device, comprising:
   a housing;
   a circuit board, disposed in the housing;
   a chip, disposed on the circuit board;
   a USB connector, connected to the circuit board;
   a metal connector, connected to the USB connector, wherein the metal connector comprises an extended portion, a gap is formed between the extended portion and the chip, and the extended portion corresponds to the chip to dissipate heat from the chip; and
   a heat transfer pad, wherein the heat transfer pad is sandwiched between the chip and the extended portion;
   wherein the housing comprises a body and a cover, the body is connected to the cover, and the circuit board is sandwiched between the body and the cover, and
   wherein a positioning hole is formed on the extended portion, a positioning post is formed on the cover, and the positioning post passes through the positioning hole.

2. The USB device as claimed in claim 1, wherein the body is wedged to the cover.

3. The USB device as claimed in claim 1, wherein the body comprises a joint receiving portion, the USB connector is received in the joint receiving portion, the metal connector surrounds the joint receiving portion, and the joint receiving portion is wedged to the metal connector.

* * * * *